Oct. 11, 1955 M. SALKIN 2,719,993
APPARATUS FOR CLEANING FRUITS AND VEGETABLES
Filed Dec. 22, 1950 6 Sheets-Sheet 1

INVENTOR.
Max Salkin
BY Lyon & Lyon
attorneys

Oct. 11, 1955  M. SALKIN  2,719,993
APPARATUS FOR CLEANING FRUITS AND VEGETABLES
Filed Dec. 22, 1950  6 Sheets-Sheet 3

INVENTOR.
Max Salkin
BY Lyon+Lyon
Attorneys

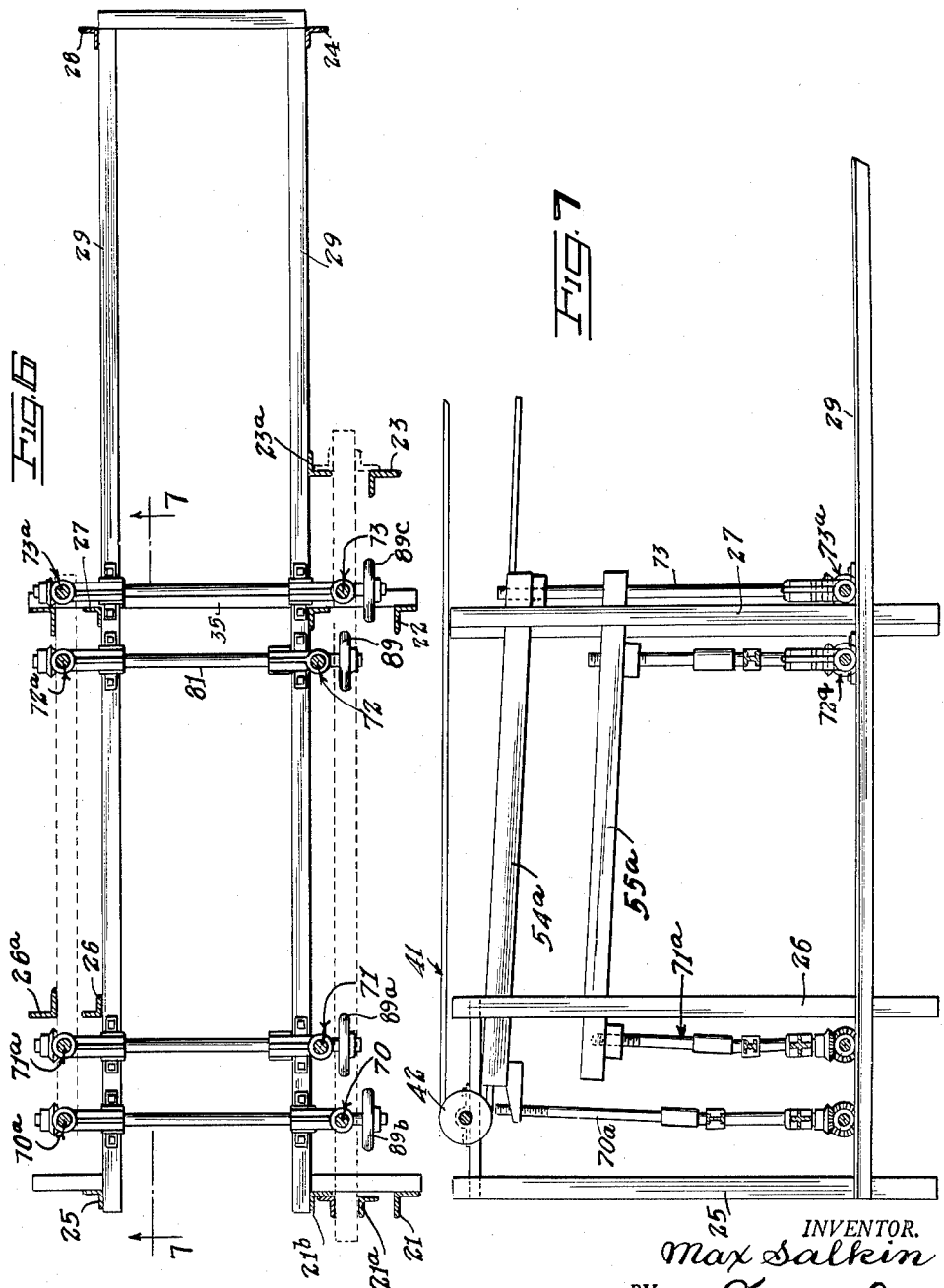

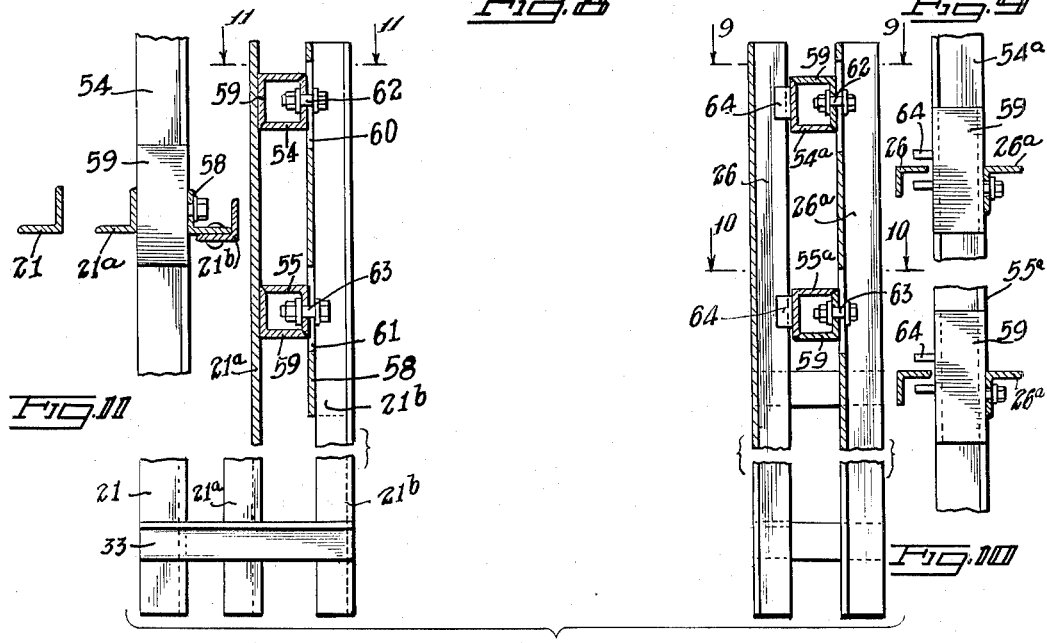
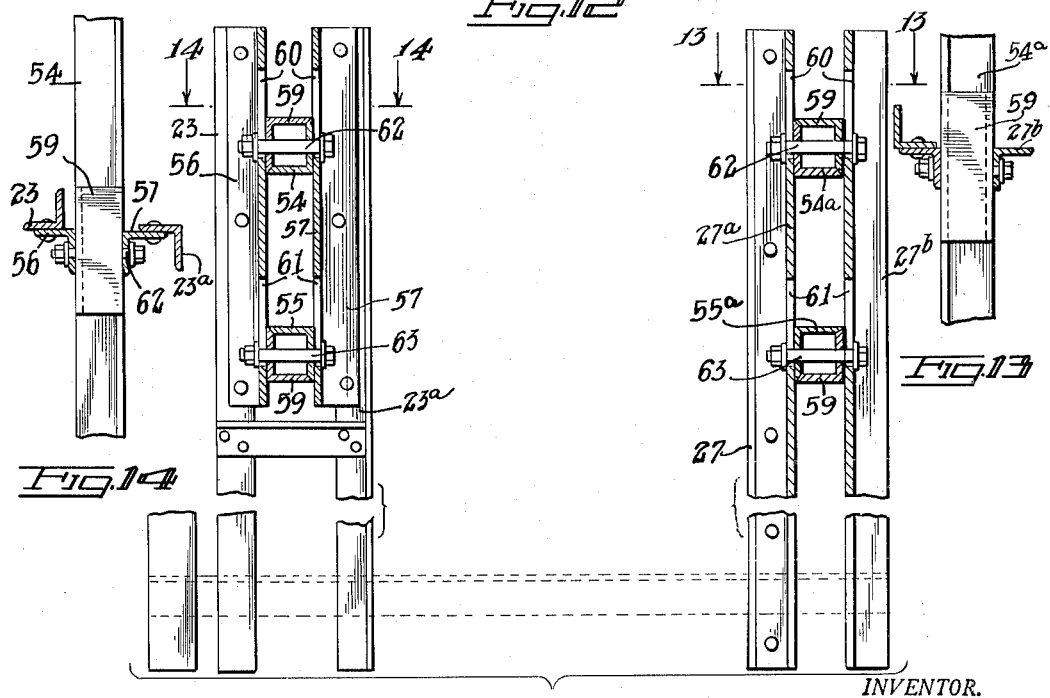

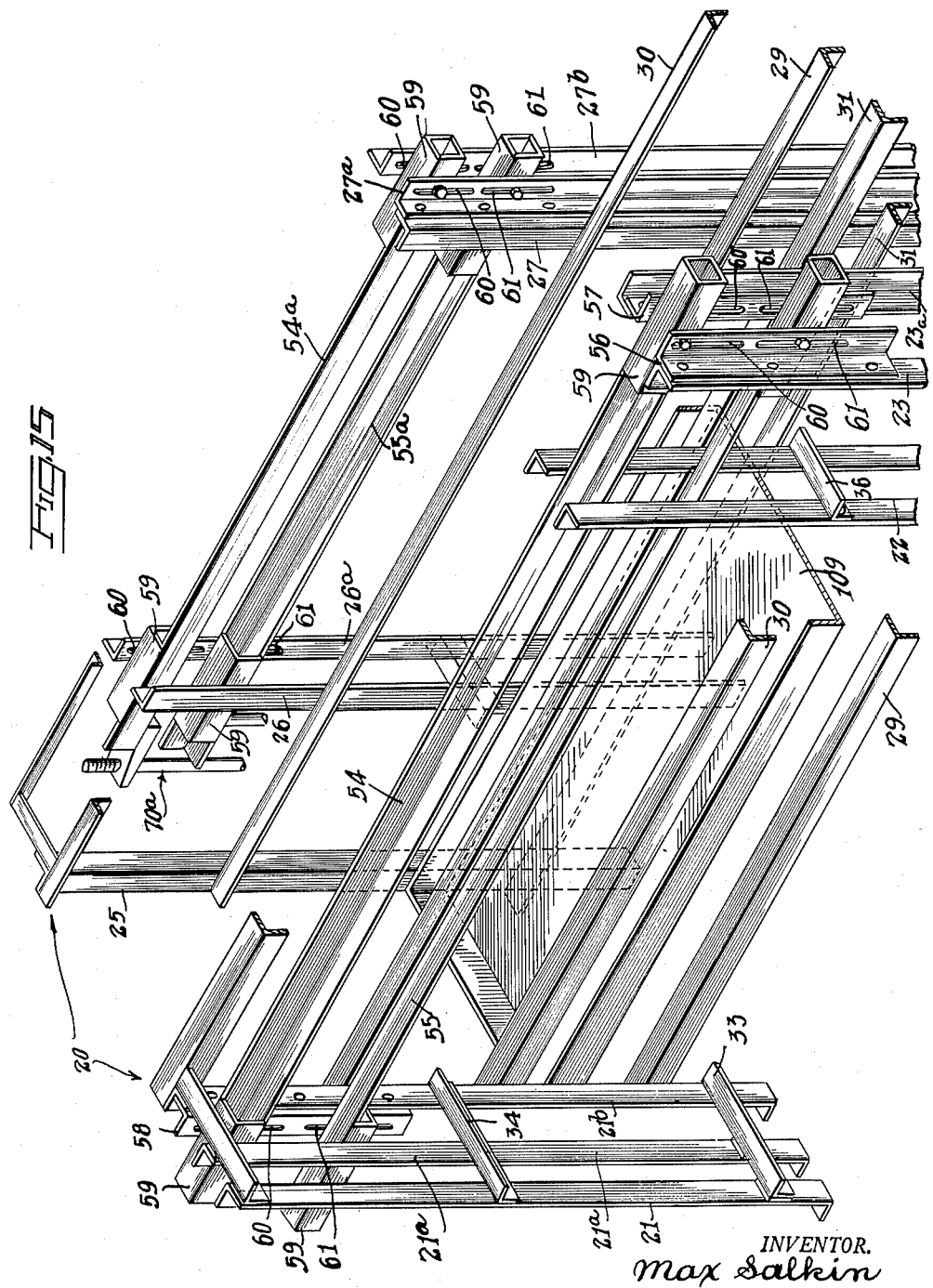

United States Patent Office 2,719,993
Patented Oct. 11, 1955

2,719,993

APPARATUS FOR CLEANING FRUITS AND VEGETABLES

Max Salkin, Berkeley, Calif., assignor to California Packing Corporation, San Francisco, Calif., a corporation of New York Application December 22, 1950, Serial No. 202,268

9 Claims. (Cl. 15—3.17)

This invention relates to apparatus for cleaning produce such as fruits and vegetables.

In the packing or canning of fruits and vegetables, the produce is generally handled on moving belts which deliver the produce to the various stations. The fruits and vegetables are generally cleaned in brush machines having a plurality of rotating brushes, and it is usually necessary to divert the produce from the moving belt, through the brush machine, and then back to the belt in order to maintain straight-through travel of the conveyor belts. In the case of peaches, pears and other substantially spherical fruits and vegetables, this diverting to and from the belt is easily accomplished by "sheering" the produce off of and onto the belt by means of stationary angularly disposed or inclined gates. In the case of produce such as asparagus and the like, however, their shape makes such "sheering" very difficult, and, further, material damage to the relatively tender asparagus heads may occur upon contact with the stationary gates.

Accordingly, an important object of this invention is to provide a produce cleaning machine having novel pickup means for removing asparagus or other fruits and vegetables from a moving belt.

Another object of my invention is to provide a machine which is designed to permit straight-through travel of the conveyor belt.

Another object of my invention is to provide a produce cleaning machine in which is employed a plurality of rotary brushes mounted in upper and lower banks, the banks being independently vertically adjustable.

A further object of my invention is to provide a produce cleaning machine which is provided with a plurality of rotating brushes mounted in upper and lower banks, the opposite ends of both of the banks of brushes being independently adjustable vertically.

Other objects and advantages of this invention it is believed will be apparent from the following detailed description of a preferred embodiment thereof as illustrated in the accompanying drawings:

Figure 4 is a schematic illustration of the chain drive.

Figure 6 is a sectional elevation taken substantially along the line 6—6 of Figure 2.

Figure 7 is a fragmentary section taken substantially on the line 7—7 of Figures 1 and 6.

Figure 8 is a sectional elevation taken substantially along the line 8—8 of Figure 1.

Figure 9 is a sectional elevation taken substantially along the line 9—9 of Figure 8.

Figure 10 is a section taken substantially along the line 10—10 of Figure 8.

Figure 11 is a section taken substantially along the line 11—11 of Figure 8.

Figure 12 is a section taken substantially along the line 12—12 of Figure 1.

Figure 13 is a section taken substantially along the line 13—13 of Figure 12.

Figure 14 is a section taken substantially along the line 14—14 of Figure 12.

Figure 15 is a fragmentary perspective elevation of the framework.

While in the following description the machine which embodies a preferred form of my invention is referred to in connection with the cleaning of asparagus, it is to be understood that this is only by way of example, since the use of the machine is not limited to the cleaning of asparagus. As will be readily understood by those skilled in the art, the machine may be used for cleaning any type of fruit or vegetable.

Figure 1:
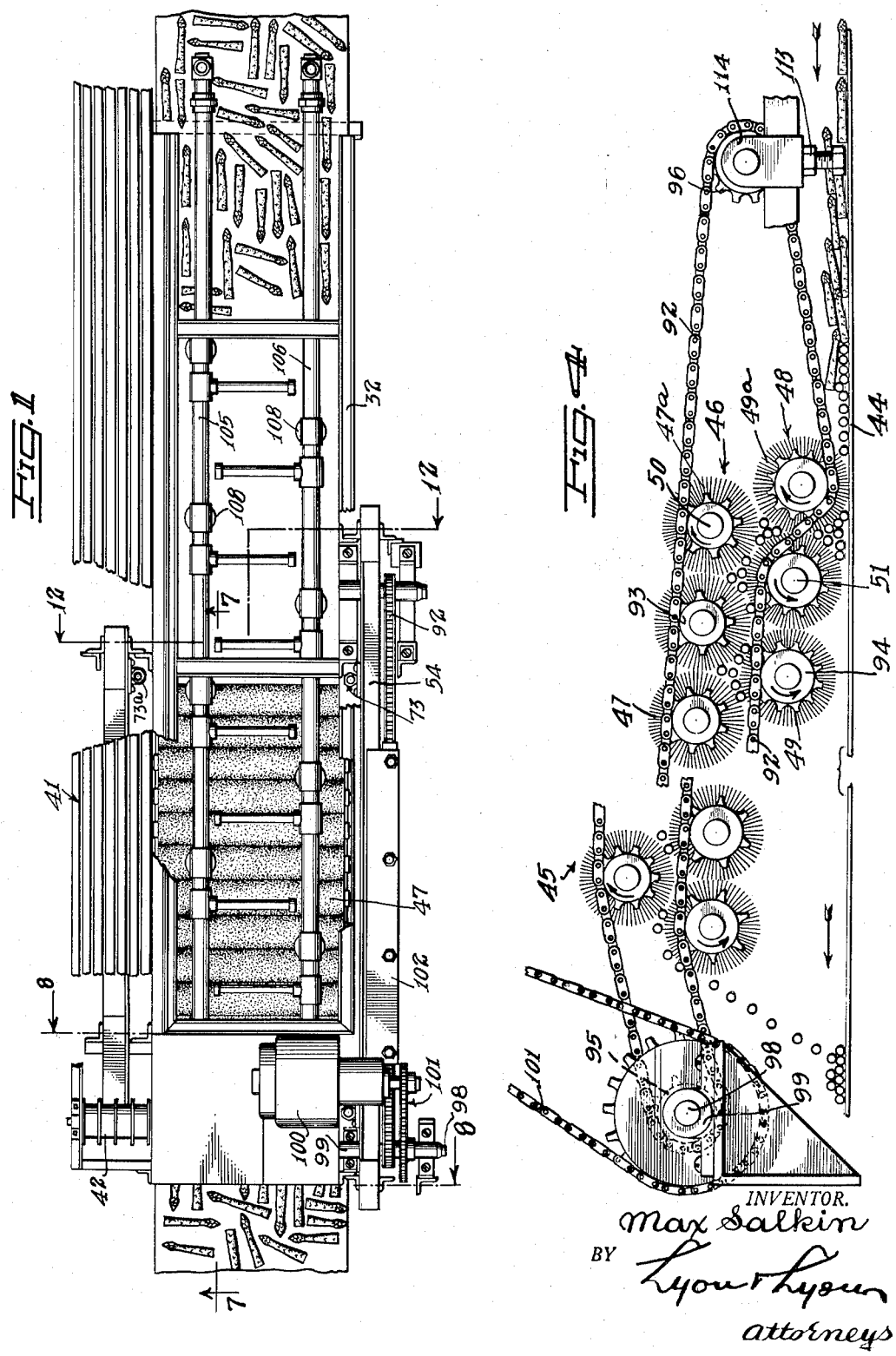
Figure 1 is a plan view of the machine with parts broken away and the top cover removed for clarity of illustration.

Referring now to the drawings, the machine which embodies my invention includes a frame generally indicated 20 having a plurality of vertical support members 21, 21a, 21b, 22, 23, 23a and 24 on one side of the machine and 25, 26, 27 and 28 on the other side of the machine. The frame further includes horizontal longitudinal support members 29, 30, 31 and 32 and transverse braces 33, 34, 35, 36, 37, 38, 39 and 40. It will be noted from the above description and from the drawings that the two longitudinal sides of the machine are not symmetrical with respect to each other. This is necessitated by the fact that the cleaning machine hereinafter to be described is only a portion of a larger machine for handling vegetables such as asparagus. A portion of this existing machine is illustrated in Figure 1 and comprises a plurality of conveyor belts or chains 41 operating at one end over a multiple pulley 42. The asparagus from the field is placed on these belts by the operators to be carried to the cutting knives (not shown).

A plurality of rollers 43 are mounted on the horizontal support members 31 and extending therebetween to support the asparagus conveyor belt 44. The conveyor belt 44 is a conventional apertured endless belt and is provided with suitable means (not shown) for continuous movement through the machine.

Mounted on the frame 20 is the brush cleaner unit generally indicated 45 which includes an upper bank 46 of rotary brushes 47 and a lower bank 48 of rotary brushes 49. The upper and lower brushes are carried on shafts 50 and 51 respectively which are journaled in suitable bearings 52 and 53. The bearings 52 are secured to upper angles 54 and 54a and the bearings 53 to lower angles 55 and 55a. The bearings 52 and 53 are positioned on the respective angles so that the axes of the brushes are mutually parallel, with the upper bank of brushes 47 being staggered with respect to the lower bank of brushes 49.

Means are provided for adjustably mounting the upper and lower rows of brushes. As shown best in Figures 8–15, these means may include, on one side of the frame, the pair of slotted guide angles 56 and 57 secured to vertical support members 23 and 23a respectively and the slotted guide angle 58 secured to vertical support member 21b. On the other side of the frame are provided the slotted guide angle 27a secured to vertical support member 27, slotted guide angle 27b, and slotted guide member 26a connected with vertical support member 26. Auxiliary angle members 59 are welded to the ends of each of the upper angles 54 and lower angles 55 to provide a box-like structure. Each of the guide angle members is provided with upper and lower vertical slots 60 and 61 in which are received transverse bolts 62 and 63 carried at each end of the upper and lower angles 54, 54a and 55, 55a. One end of each of the angles 54 and 55 is slidably secured to the guide angle 58 and also contacts the vertical support member 21a, the other end of each of the angles 54 and 55 being slidably secured to the guide angles 56 and 57. One end of each of the angles 54a and 55a is slidably secured to the guide angles 27a and 27b, while the other end of each is slidably secured to the guide angle 26a and in contact with the edge of the vertical support member 26. Additional guide elements 64 are welded to this latter end of the angles 54a and 55a to form a guide channel for the reception of the edge of the vertical support member 26 (see Figures 8, 9 and 10).

Vertical adjustment of the upper and lower angles with respect to the frame is effected by means of the adjusting screw members generally indicated 70, 71, 72 and 73 on one side of the frame, and the adjusting screw members generally indicated 70a, 71a, 72a and 73a on the other side of the frame.

Figure 2:
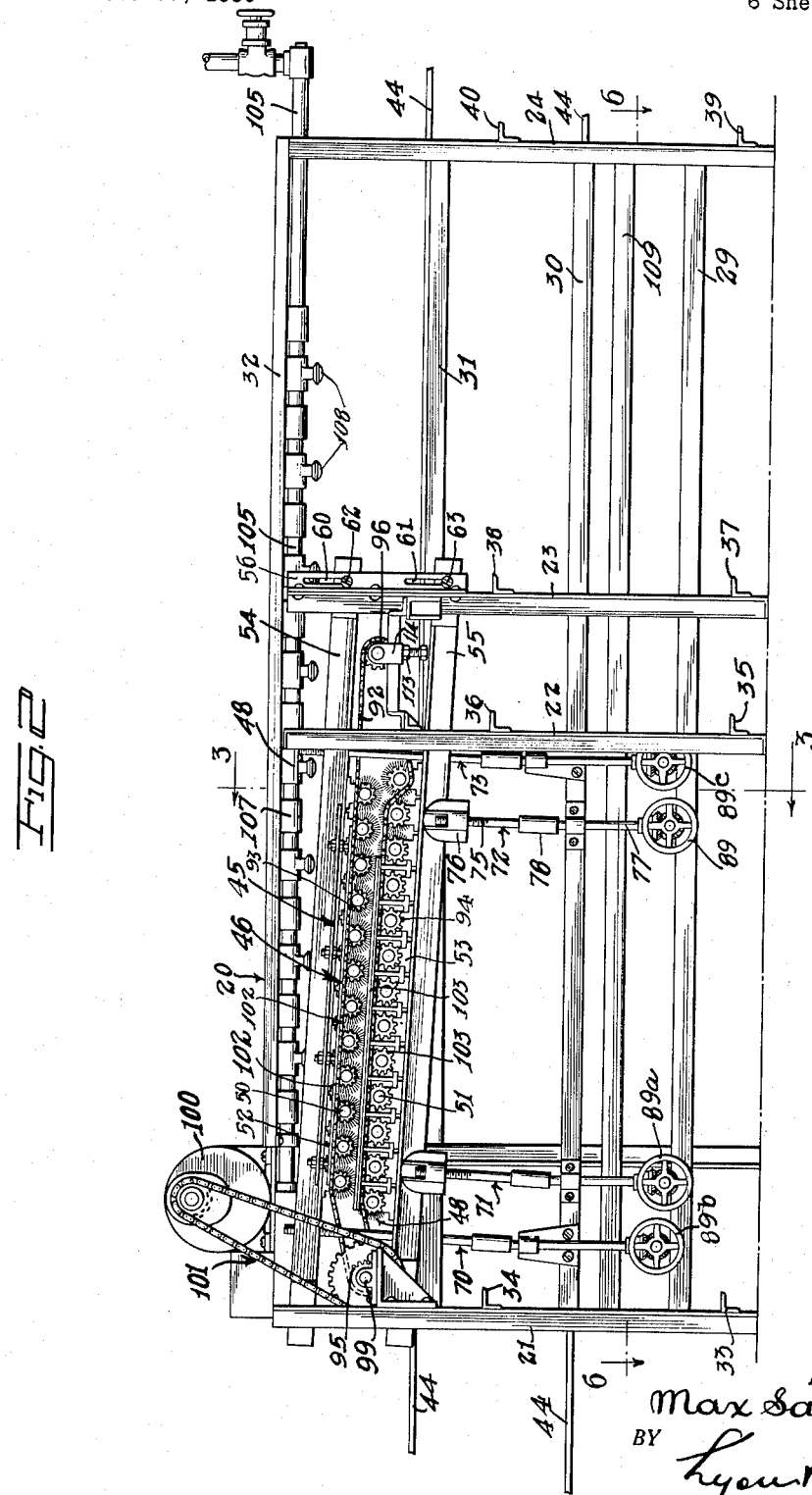
Figure 2 is a side view of the machine shown in Figure 1.
Figure 3:
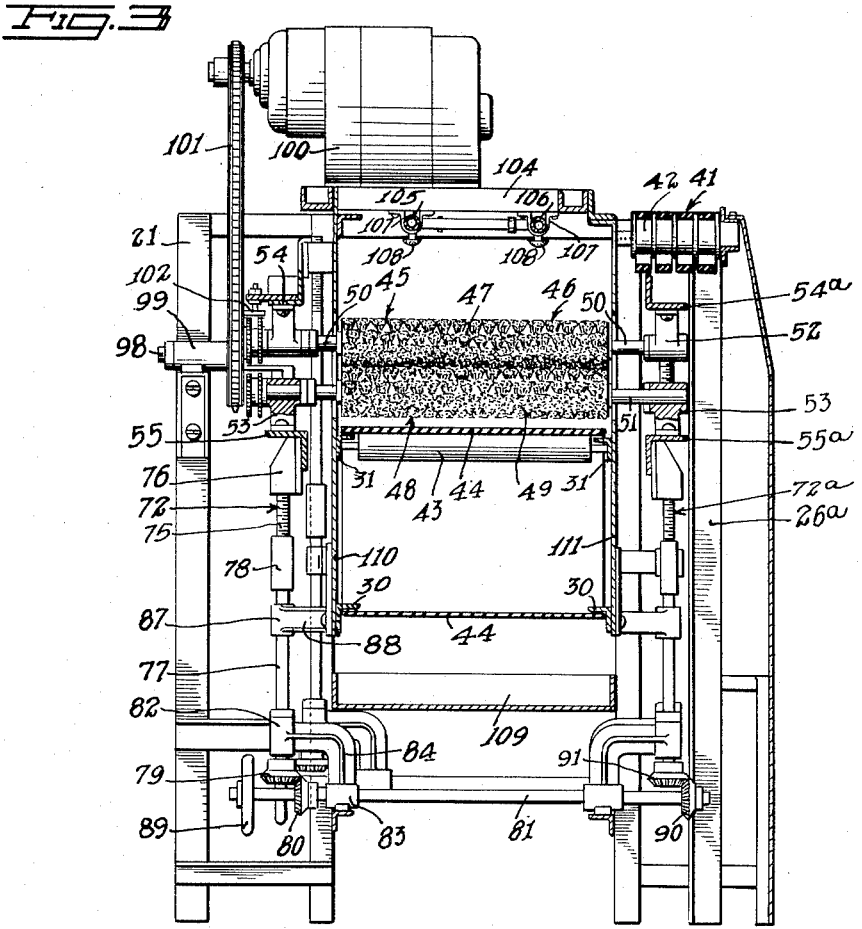
Figure 3 is a section taken along the line 3—3 of Figure 2.

The adjusting screw member 72 comprises an adjusting screw 75 threadedly engaged in the threaded portion of a bracket 76 secured adjacent one end of the lower angle 55. The screw 75 is connected to a bevel gear shaft 77 by means of universal joint 78. The shaft 77 carries a bevel gear 79 which engages with a gear 80 on the drive shaft 81. The shafts 77 and 81 are journaled in bearings 82 and 83 carried on a bracket 84. The shaft 77 is journaled at its upper end in a bearing 87 carried on a bracket 88 secured to the horizontal support member 30. A hand wheel 89 is provided on the end of the drive shaft 81 for manual operation of the adjusting screw. The drive shaft 81 extends transversely of the frame and carries at its other end a bevel gear 90 for engagement with the bevel gear 91 of the adjusting screw member 72a. It will thus be seen that the adjusting screw members 72 and 72a may be simultaneously operated by means of the hand wheel 89 for vertical adjustment of the right end of the lower bank of brushes as seen in Figure 2. The other adjusting screw members are similarly arranged, the members 71 and 71a being operated by hand wheel 89a to raise or lower the other end of the lower bank of brushes and the members 70, 70a and 73, 73a being secured respectively to each end of the upper angles 54 and 54a for vertical adjustment of the upper bank of brushes by operation of hand wheels 89b and 89c respectively. By means of these adjusting screw members the upper and lower banks of brushes may be independently vertically adjusted, and likewise each end of the banks may be independently vertically adjusted.

Figure 5:
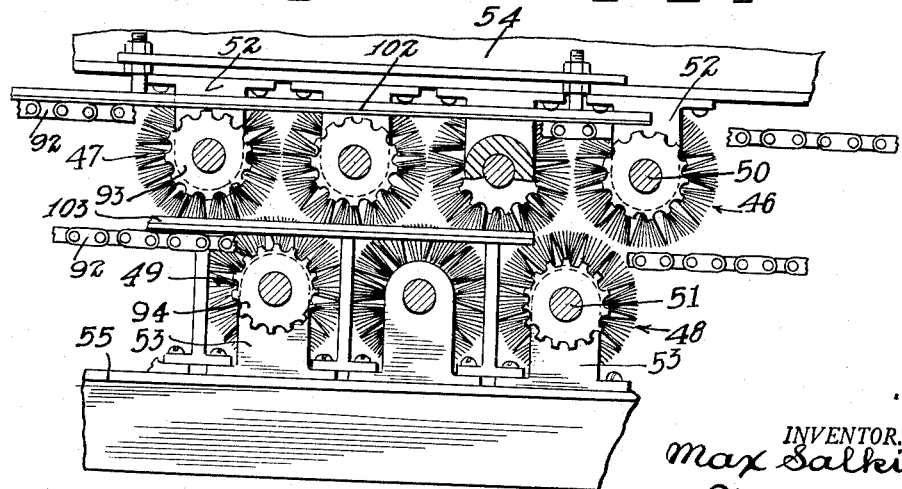
Figure 5 is an enlarged fragmentary side view showing the brushes in detail.

As shown in the drawings, the two banks of brushes are preferably mounted at a slight angle away from the horizontal with the first brush 49a of the lower bank 48 being in contact with the conveyor belt 44 which moves in the direction on the arrows in Figure 4. Means are provided to rotate the brushes 47 and 49, and as shown in the drawings these means may include the chain 92 and sprockets 93 and 94 carried on the shafts 50 and 51 respectively. The chain 92 extends from the drive sprocket 95 to the adjustable idler sprocket 96. As shown by the arrows in Figure 4, the chain 92 is arranged to drive the upper bank of brushes in a clockwise direction and the lower bank of brushes in a counterclockwise direction, with the exception of the first or leading brush 49a in the lower bank which is driven clockwise. The drive sprocket 95 is carried on a stub shaft 98 journaled in suitable bearings 99 carried on the frame and is driven by means of the motor 100 through the transmission 101. Means are provided to prevent the chain 92 from disengaging from the teeth of the sprockets 93 and 94, and, as shown best in Figure 5, these means may include the chain hold-down plates 102 and 103 secured to angles 54 and 55 respectively.

Water distribution means are provided for cleaning and cooling the blanched asparagus, and as shown in the drawings these means may include the pair of parallel inlet water pipes 105 and 106 secured to the upper transverse support member 104 by means of suitable brackets 107. A plurality of sprinkler heads 108 are provided in the inlet pipes 105 and 106 to effectively distribute water downwardly over the asparagus as it is conveyed along the belt 44 and while it is being cleaned by the brushes 47 and 49. A drainage pan 109 is secured to the vertical support members below the conveyor belt 44 for the recovery of water and debris washed from the asparagus, vertical sheet metal splash plates 110 and 111 being provided on either side of the brush cleaner unit.

The operation of the machine is as follows: Asparagus from the field is placed onto the conveyor 41 and conveyed to the right, as seen in Figure 1, to the feed end (not shown) of the machine. The vegetable is graded, sorted, blanched and undergoes other operations conventionally employed in the preparation of the material for cleaning. These operations are well known to those skilled in the art, and hence are not shown or described herein, but it is to be understood that the asparagus at all times during these operations is handled upon the conveyor 44. After undergoing these operations, the asparagus is fed to that portion of the machine illustrated in the drawings wherein the stalks proceed under the first brush 49a in the lower bank of brushes. At this point, because of the opposite directions of rotation of the leading brush 49a and the next adjacent brush 49, the asparagus is picked up from the belt into the bite between these brushes and fed in between the upper bank of brushes 46 and the lower bank 48, the leading brush 47a of the upper bank preventing deflection of the stalks out of the path between the banks of brushes. The sprockets 93 for driving the upper bank of brushes preferably have less teeth than the sprockets 94 for driving the lower bank of brushes, and hence the upper bank is driven at a faster speed than the lower bank to impart a frictional action, thus assisting in the cleaning of the asparagus. The stalks are conveyed between the upper and lower banks of brushes to the discharge end of the brush cleaner unit where they are given a final impetus by the last brush in the lower bank from whence the cleaned material drops to the conveyor belt 44.

As pointed out above, the upper and lower sets of brushes are independently adjustable in a vertical direction, and, further, the receiving and delivery ends of the brush assemblies may be independently vertically adjusted. Therefore, if desired, the receiving or pick-up end of the brush assembly may be moved vertically away from the belt 44 so that the first brush does not contact the asparagus and the asparagus may then travel along the belt without receiving a cleaning action. This is necessary when tender asparagus such as early season stock is being treated. The pick-up end of the lower bank of brushes may be adjusted relative to the conveyor belt for the most effective feeding action. These adjustments are necessary for different sizes of asparagus as well as for the degree of tenderness of the asparagus. By the adjustable arrangement described above, the inclination of the lower bank of brushes with relation to the upper bank and also the spacing between the two banks of brushes may be varied to effect the degree of brushing action. With certain types of asparagus it is desirable to vary the intensity of brushing action, and the adjustment means provided permit such varying wherein the two banks at the pick-up end may be closer together than at the delivery end, or vice versa.

The adjustable idler sprocket 96 is provided to take up or play out the drive chain 92 during major adjustments of the two banks and has a lock nut 113 for securing the idler sprocket bracket 114 in the desired positions. However, I have found that for minor adjustments the sprocket 96 need not be shifted.

It will thus be understood that I have provided a cleaning machine for asparagus and other vegetables and fruits which has means for picking up the produce without injury thereto and which is further so arranged that straight-through travel of the conveyor belt may be maintained. It will be understood, of course, that the cleaner and pick-up means will operate in the same manner if arranged to pick up produce from one conveyor and deliver the cleaned produce to a different conveyor where plant conditions might require a change in direction of travel of the produce to be cleaned.

While I have shown and described a specific embodiment of my invention, I do not limit myself to the exact details of the construction set forth, and the invention embraces such changes, modifications and equivalents of the parts and the formation and arrangement as come within the purview of the appended claims.

I claim:

1. In an apparatus for cleaning fruits and vegetables and the like, the combination of a frame, a generally horizontal conveyor adapted to travel through the frame, a pair of parallel rotary brushes mounted on the frame above the conveyor, the axes of the brushes being substantially parallel and the peripheries of the brushes being in substantially tangential relationship to form a bite between the brushes, both of said brushes being sufficiently close to said conveyor to engage produce thereon, means for rotating the brushes in opposite angular directions so that the portions of the brushes adjacent the bite move upwardly, whereby produce to be cleaned may be picked up from the conveyor and drawn upwardly into the bite between the brushes, and a third rotary brush mounted above the pair of brushes, the third brush cooperating with one of said pair of brushes and rotating in the same angular direction to change the path of travel of produce delivered from the bite between the pair of brushes.

2. In an apparatus for cleaning fruits and vegetables and the like, the combination of a frame, a generally horizontal conveyor adapted to travel through the frame, a pair of parallel rotary brushes mounted on the frame above the conveyor and extending transversely of the same with at least one of the brushes being immediately adjacent the conveyor, the axes of the brushes being substantially parallel and the peripheries of the brushes being in substantially tangential relationship to form a bite between the brushes, both of said brushes being sufficiently close to said conveyor to engage produce thereon, means for rotating the brushes in opposite angular directions so that the portions of the brushes adjacent the bite move upwardly, whereby produce to be cleaned may be picked up from the conveyor and drawn upwardly into the bite between the brushes, and a third rotary brush mounted above the pair of brushes, the third brush cooperating with one of said pair of brushes and rotating in the same angular direction to change the path of travel of produce delivered from the bite between the pair of brushes.

3. In an apparatus of the character described, the combination of a frame, a generally horizontal conveyor belt adapted to travel through the frame, a pair of rotary brushes journaled in the frame with their axes mutually parallel and lying in a plane forming an acute angle inclined away from the horizontal and in the same direction with the path of travel of the conveyor belt, the peripheries of the brushes being in substantially tangential relationship to form a bite therebetween, the leading brush of said pair being immediately adjacent the conveyor belt and the other brush being sufficiently close to the conveyor to engage produce thereon, means for rotating the leading brush in a direction so that portion of the brush nearest the conveyor belt moves in the same direction as does the conveyor belt, and means for rotating the other brush in the opposite direction, whereby produce to be cleaned may be picked up from the conveyor belt and drawn into the bite between the brushes.

4. In an apparatus of the character described, the combination of a frame, a generally horizontal conveyor belt adapted to travel through the frame, a pair of rotary brushes journaled in the frame with their axes mutually parallel and lying in a plane forming an acute angle inclined away from the horizontal and in the same direction with the path of travel of the conveyor belt, the peripheries of the brushes being in substantially tangential relationship to form a bite therebetween, the leading brush of said pair being immediately adjacent the conveyor belt and the other brush being sufficiently close to the conveyor to engage produce thereon, means for rotating the leading brush in a direction so that that portion of the brush nearest the conveyor belt moves in the same direction as does the conveyor belt, means for rotating the other brush in the opposite direction, whereby produce to be cleaned may be picked up from the conveyor belt and drawn into the bite between the brushes, and a third brush mounted for rotation above the pair of brushes, the third brush cooperating with one of said pair of brushes and rotating in the same angular direction to change the path of travel of produce delivered from the bite between the pair of brushes.

5. In an apparatus of the character described, the combination of a frame, a generally horizontal conveyor belt adapted to travel through the frame, a pair of rotary brushes journaled in the frame with their axes mutually parallel and lying in a plane forming an acute angle inclined away from the horizontal and in the same direction with the path of travel of the conveyor belt, the peripheries of the brushes being in substantially tangential relationship to form a bite therebetween, the leading brush of said pair being immediately adjacent the conveyor belt and the other brush being sufficiently close to the conveyor to engage produce thereon, means for rotating the leading brush in a direction so that that portion of the brush nearest the conveyor belt moves in the same direction as does the conveyor belt, means for rotating the other brush in the opposite direction, whereby produce to be cleaned may be picked up from the conveyor belt and drawn into the bite between the brushes, a third brush journaled in said frame above and parallel to said pair of brushes and coacting therewith so as to form a pair of bites, one between said third brush and each of said pair of brushes, and means for rotating the third brush in the same direction as the direction of rotation of the leading brush, whereby the path of travel of produce delivered from the bite between said pair of brushes is changed.

6. In an apparatus for cleaning fruits and vegetables and the like, the combination of a frame; a generally horizontal conveyor belt adapted to travel through the frame; upper and lower banks of rotary brushes mounted on said frame above said conveyor belt, the banks of brushes coacting to form a path for the travel of produce therebetween; and means for rotating the leading brush of the lower bank, in a direction so that that portion of the leading brush nearest the conveyor belt moves in the same direction as does the conveyor belt, means for rotating the brushes of the upper bank in the same direction as the direction of rotation of said leading brush, and means for rotating the remainder of the brushes of the lower bank in the other direction, the brush next adjacent the leading brush of the lower bank being sufficiently close to the conveyor belt to engage produce thereon.

7. In an apparatus of the character described, the combination of a frame; a horizontal conveyor belt adapted to travel through the frame; upper and lower banks of rotary brushes mounted in parallel relation above said conveyor belt and at an upwardly inclined angle therefrom, the brushes of the upper bank being staggered with respect to the brushes of the lower bank and cooperating therewith to form an upwardly inclined path for the travel of produce therebetween, the leading brush of the lower bank being positioned immediately adjacent the conveyor belt, and the other brush being sufficiently close to the conveyor belt to engage produce thereon; means for retaining said leading brush in a direction so that that portion of the leading brush nearest the conveyor belt moves in the same direction as does the conveyor belt; means for rotating the brushes of the upper bank in the same direction as the direction of rotation of said leading brush; and means for rotating the remainder of the brushes of the lower bank in the opposite direction.

8. In an apparatus for cleaning fruits and vegetables and the like, the combination of a frame; a generally horizontal conveyor belt adapted to travel through the frame; upper and lower banks of rotary brushes mounted on said frame above said conveyor belt, the banks of brushes coacting to form a path for the travel of produce therebetween; means for rotating the leading brush of the lower bank, in a direction so that that portion of the leading brush nearest the conveyor belt moves in the same direction as does the conveyor belt, means for rotating the brushes of the upper bank in the same direction as the direction of rotation of said leading brush, and means for rotating the remainder of the brushes of the lower bank in the other direction, the brush next adjacent the leading brush of the lower bank being sufficiently close to the conveyor belt to engage produce thereon; and means for independently adjusting the upper and lower banks of brushes in a vertical direction.

9. In an apparatus for cleaning fruits and vegetables and the like, the combination of a frame; a generally horizontal conveyor belt adapted to travel through the frame; upper and lower banks of rotary brushes mounted on said frame above said conveyor belt, the banks of brushes coacting to form a path for the travel of produce therebetween; means for rotating the leading brush of the lower bank, in a direction so that that portion of the leading brush nearest the conveyor belt moves in the same direction as does the conveyor belt, means for rotating the brushes of the upper bank in the same direction as the direction of rotation of said leading brush, and means for rotating the remainder of the brushes of the lower bank in the other direction, the brush next adjacent the leading brush of the lower bank being sufficiently close to the conveyor belt to engage produce thereon; the means for independently adjusting, in a vertical direction, each end of each of the banks of brushes.

References Cited in the file of this patent

UNITED STATES PATENTS

| Number | Name | Date |
|---|---|---|
| 850,777 | Mosher | Apr. 16, 1907 |
| 1,706,577 | Larsen | Mar. 26, 1929 |
| 1,740,870 | Ofstad | Dec. 24, 1929 |
| 1,864,085 | Moe | June 21, 1932 |
| 2,054,713 | Randolph | Sept. 15, 1936 |
| 2,233,611 | Hollenbeck | Mar. 4, 1941 |
| 2,286,393 | Thomas | June 16, 1942 |
| 2,412,565 | Davis | Dec. 17, 1946 |